O. MUELLER.
CULTIVATOR.
APPLICATION FILED NOV. 27, 1915.
1,183,482.
Patented May 16, 1916.
2 SHEETS—SHEET 1.
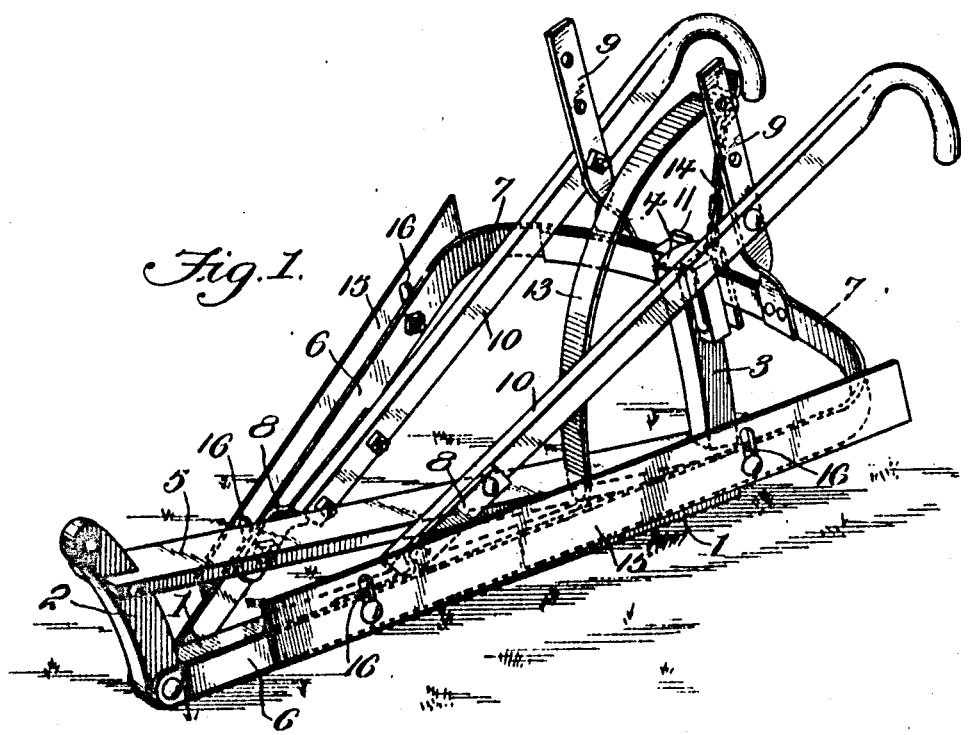
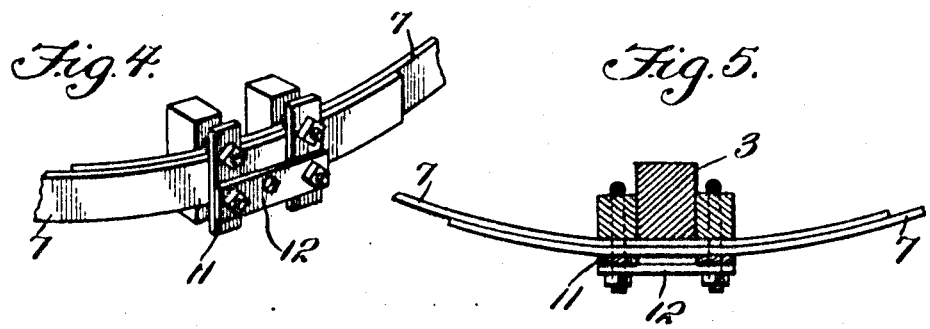
Witnesses
J. T. L. Wright
L. Wilcox
Inventor
Otto Mueller
By Victor J. Evans
Attorney

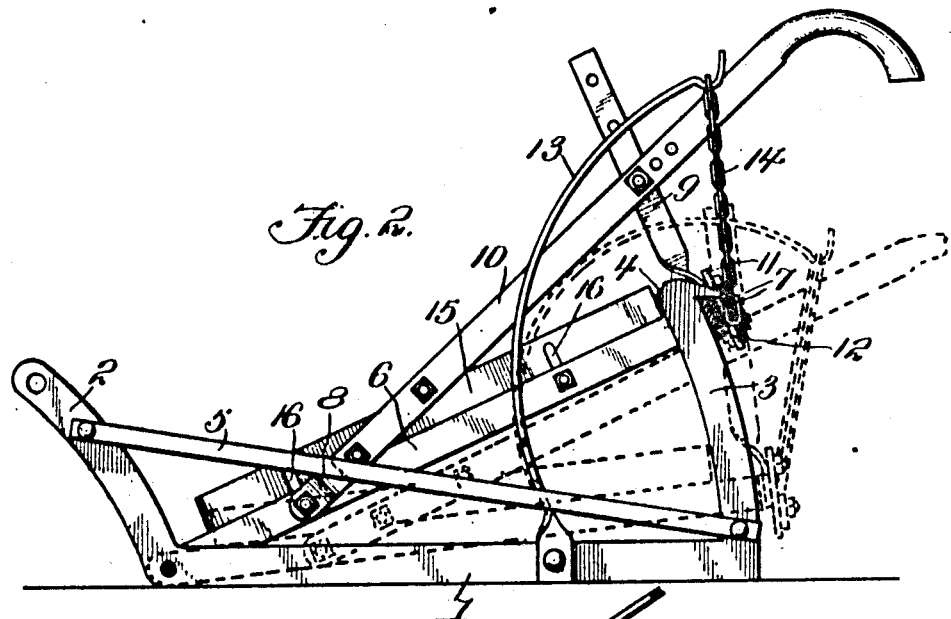
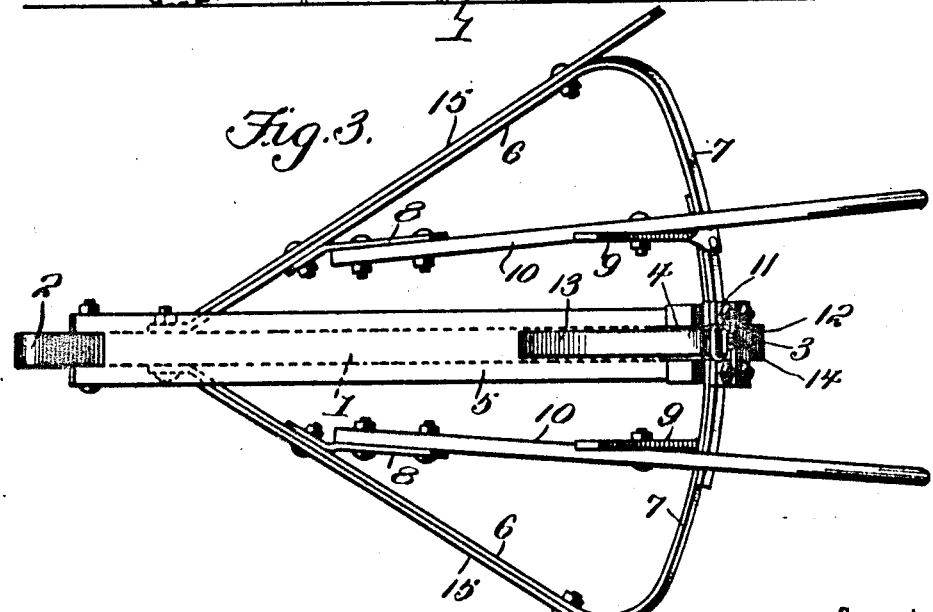

UNITED STATES PATENT OFFICE.

OTTO MUELLER, OF ELKTON, FLORIDA.

CULTIVATOR.

1,183,482.
Specification of Letters Patent.
Patented May 16, 1916.

Application filed November 27, 1915. Serial No. 63,780.

*To all whom it may concern:*

Be it known that I, OTTO MUELLER, a citizen of the United States, residing at Elkton, in the county of St. Johns and State of Florida, have invented new and useful Improvements in Cultivators, of which the following is a specification.

This invention relates to cultivators and it consists in the novel features hereinafter described and claimed.

An object of the invention is to provide a cultivator especially adapted to be used for lifting the soil at the side of two rows of plants at the same time there being parts connected with the cultivator and adapted to be manually manipulated for regulating the quantity of soil cast in order that sufficient soil may be deposited along the rows of plants but an excessive amount of soil so deposited may be avoided.

With the above object in view the cultivator comprises a keel provided at its forward end with an upstanding post to which the draft animal may be attached. The keel is provided at its rear end with an upstanding arcuate post and a brace is interposed between the said posts. Frame members are pivotally connected at their forward ends with the forward portion of the keel at the opposite side thereof and the said frame members have arcuate rear portions which overlap each other. Clamping members are applied to the overlapping portions of the frame members and are located at the opposite sides of the arcuate posts and serve as guides whereby the said posts may move transversely with relation to the rear portions of the frame members. Handles are mounted upon the frame members and a spring is connected with the keel and passes vertically through the said brace. A flexible element connects the upper end of the spring with the said clamping members and the spring is undertensioned with a tendency to normally hold the rear portions of the frame members toward the upper end of the arcuate posts. The arcuate post is provided at its upper end with a stop adapted to limit the upward swinging movement of the said frame members.

In the accompanying drawings:—Figure 1 is a perspective view of the cultivator. Fig. 2 is a side elevation of the same. Fig. 3 is a top plan view of the same. Fig. 4 is a perspective view of the intermediate rear portion of the same. Fig. 5 is a horizontal sectional view of the parts shown in Fig. 4 with parts illustrated in edge elevation.

As illustrated in the accompanying drawings the cultivator comprises a keel 1 having at its forward end an upstanding post 2, to which a draft animal may be attached in any suitable manner. An upstanding arcuate post 3 is provided at the rear end of the keel 1 and the post 3 is provided at its upper end with a stop 4. A brace 5 is interposed in an inclined position between the posts 2 and 3 and the rear end of the said brace connects with the post 3 in the vicinity of the point where the said post joins with the keel 1. Frame members 6 are pivotally connected at their forward ends with the forward ends of the keel 1 and at the opposite sides thereof. The forward portions have the frame members 6 converge toward each other toward the forward end of the keel. The rear portions 7 of the frame members 6 are arcuate in a vertical plane and the said arcuate portions overlap each other. Brackets 8 are mounted upon the forward portions of the frame members 6 and brackets 9 are mounted upon the arcuate rear portions of the said frame members. Handles 10 are mounted upon the said brackets. The forward brackets 8 are pivotally connected with the frame members 6 and the handles 10 are adjustably connected with the brackets 9 whereby the said handles may be positioned at a desired angle with relation to a horizontal.

Clamping members 11 are applied to the overlapping rear portions 7 of the frame members and serve as means for holding the said frame members at adjusted position with relation to each other. The said clamping members 11 also lie at the opposite sides of the arcuate posts 3 but the said post is free to move up or down between the said clamping members. The downward movement of the post 3 between the clamping members 11 is limited by the stop 4. A cross bar 12 is connected with the clamping members 11 which are located at the opposite sides of the post 3 and the said cross bar is preferably connected with the said clamping members which lie below the lower edges of the rear arcuate portions 7 of the frame members 6. A spring 13 is connected at its lower end with the intermediate portion of the keel 1 and passes vertically through the brace 5. The upper portion of the spring 13 is disposed above the arcuate portions 7 of the frame members and between the rear parts of the handles 10. A flexible element 14, such for instance as a chain, is connected at one end with the upper end of the spring 13 and at its lower end is connected with the cross bar 12. The spring 13 is undertensioned with a tendency to hold through the connecting flexible element 14 the upper edges of the arcuate portions 7 of the frame members 6 in engagement with the stop 4 at the upper end of the arcuate post 3.

When the cultivator is in operation and assuming that the keel moves along a horizontal line the frame members 6 are positioned at an angle to a horizontal with the rear parts of the said frame members at a higher elevation than their forward parts. Blades 15 are adjustably connected with forward portions of the frame members 6 by means of a bolt and slot connection 16 and the said blades encounter the soil and cast the same up in opposite directions and adjacent the sides of two rows of standing plants as the cultivator is moved between the plants. The operator may at times bear his weight upon the rear ends of the handles 10 whereby the rear portions of the frame members 6 are depressed and consequently the blades 15 may be caused to operate deeper in the soil at desired points and at these points more soil is cast up along the rows of standing plants.

From the above description taken in conjunction with the accompanying drawing it will be seen that a cultivator of simple and durable structure is provided and that the same may be easily and quickly manipulated while in use to cause the blades thereof to cast desired amounts of soil along the rows of plants between which the cultivator is operating.

Having described the invention what is claimed is:

1. A cultivator comprising a keel provided with an upstanding arcuate post having at its upper end a stop, frame members pivotally connected with the forward portion of the keel and having overlapping arcuate rear portions, clamping members applied to the overlapping arcuate portions of the frame members and securing them at adjusted position with relation to each other, said clamping members lying at the opposite sides of the arcuate post and a spring mounted upon the keel and connected with the said clamping members.

2. A cultivator comprising a keel having at one end an upstanding arcuate post provided at its top with a stop, frame members pivotally connected with the keel and having arcuate overlapping rear portions, clamping members applied to the overlapping rear portions of the frame members and securing them at adjusted positions with relation to each other, said clamping members lying at the opposite sides of the arcuate posts, and a spring connected with the keel and with the frame members and being undertensioned with a tendency to hold the rear portions of the frame members toward the stop upon the arcuate posts.

3. A cultivator comprising a keel, an arcuate post mounted thereon and provided with a stop, frame members pivotally connected with the keel and having overlapping arcuate rear end portions, clamping members applied to the overlapping rear end portions of the frame and securing the said portions at adjusted positions with relation to each other, said clamping members also lying at the opposite sides of the said arcuate posts, handles mounted upon the frame members, a spring connected at one end with the keel and having its other end lying between the handles and above the rear portions of the frame members, a cross bar secured to the clamping members and a flexible element connected at one end with the cross bar and at its other end with said spring.

In testimony whereof I affix my signature in presence of two witnesses.

OTTO MUELLER.

Witnesses:
WILLIS B. EDMINSTER,
S. C. EDMINSTER.

Copies of this patent may be obtained for five cents each, by addressing the "Commissioner of Patents, Washington, D. C."